(12) United States Patent
Wang et al.

(10) Patent No.: US 10,008,065 B2
(45) Date of Patent: Jun. 26, 2018

(54) METHOD AND DEVICE FOR BANKNOTE IDENTIFICATION BASED ON THICKNESS SIGNAL IDENTIFICATION

(71) Applicant: GRG Banking Equipment Co., Ltd., Guangzhou, Guangdong (CN)

(72) Inventors: Xiaoliang Wang, Guangdong (CN); Tiancai Liang, Guangdong (CN); Guang Chen, Guangdong (CN); Dingxi Chen, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 80 days.

(21) Appl. No.: 15/021,923

(22) PCT Filed: Sep. 25, 2014

(86) PCT No.: PCT/CN2014/087404
§ 371 (c)(1),
(2) Date: Mar. 14, 2016

(87) PCT Pub. No.: WO2015/085811
PCT Pub. Date: Jun. 18, 2015

(65) Prior Publication Data
US 2016/0225216 A1    Aug. 4, 2016

(30) Foreign Application Priority Data
Dec. 12, 2013    (CN) .......................... 2013 1 0681853

(51) Int. Cl.
*G06K 9/00*    (2006.01)
*G07D 7/164*    (2016.01)
(Continued)

(52) U.S. Cl.
CPC ............... *G07D 7/164* (2013.01); *G06K 9/40* (2013.01); *G06K 9/46* (2013.01); *G06K 9/6267* (2013.01);
(Continued)

(58) Field of Classification Search
None
See application file for complete search history.

(56) References Cited

U.S. PATENT DOCUMENTS

2002/0096299 A1    7/2002    Mukai
2003/0141653 A1    7/2003    Kumamoto et al.
(Continued)

FOREIGN PATENT DOCUMENTS

CN    1627327 A    6/2005
CN    1987935 A    6/2007
(Continued)

OTHER PUBLICATIONS

Extended European Search Report, dated Nov. 7, 2016, from corresponding or related European Patent Application No. 14869270.0.
International Search Report, dated Dec. 10, 2014, from corresponding International Application No. PCT/CN2014/087404.

*Primary Examiner* — Weiwen Yang
(74) *Attorney, Agent, or Firm* — Wolf, Greenfield & Sacks, P.C.

(57) ABSTRACT

A method and device for banknote identification based on thickness signal identification, allowing for simple and highly efficient identification and separation of abnormal banknotes by means of combining two thickness identification methods, namely an upward-facing area identification method and a downward-facing area identification method, for banknote identification. The recognition method comprises: collecting a thickness signal of a banknote; preprocessing the thickness signal; utilizing an upward-facing area
(Continued)

identification method to identify the thickness signal, thus acquiring an upward-facing processing identification result; utilizing a downward-facing area identification method to identify the thickness signal, thus acquiring a downward-facing processing identification result; merging the upward-facing identification processing result and the downward-facing processing identification result on the basis of a predetermined rule, acquiring a merged result; and, identifying the merged result, thus acquiring an identification result.

13 Claims, 9 Drawing Sheets

(51) Int. Cl.
    *G06K 9/40*     (2006.01)
    *G06K 9/46*     (2006.01)
    *G06K 9/62*     (2006.01)
    *G06K 9/78*     (2006.01)
    *G07D 7/20*     (2016.01)

(52) U.S. Cl.
    CPC ............. *G06K 9/78* (2013.01); *G07D 7/2008* (2013.01); *G07D 7/2016* (2013.01)

(56) References Cited

U.S. PATENT DOCUMENTS

| | | | |
|---|---|---|---|
| 2005/0141759 A1 | 6/2005 | Mori et al. | |
| 2007/0139720 A1 | 6/2007 | Uno et al. | |
| 2010/0052237 A1* | 3/2010 | Herczeg | B65H 7/00 271/3.16 |
| 2011/0309572 A1* | 12/2011 | Miyamoto | B65H 7/02 271/265.04 |
| 2012/0092672 A1* | 4/2012 | Saltsov | G07D 7/12 356/432 |

FOREIGN PATENT DOCUMENTS

| | | |
|---|---|---|
| CN | 101266701 A | 9/2008 |
| CN | 101754919 A | 6/2010 |
| CN | 101788280 A | 7/2010 |
| CN | 201594293 U | 9/2010 |
| CN | 101872501 A | 10/2010 |
| CN | 203133923 U | 8/2013 |
| CN | 103617671 A | 3/2014 |
| CN | 103679914 A | 3/2014 |
| EP | 2174899 A1 | 4/2010 |
| EP | 2249315 A1 | 11/2010 |
| JP | S61270609 A | 11/1986 |
| JP | H01209309 A | 8/1989 |
| JP | 2007072583 A | 3/2007 |

\* cited by examiner

METHOD AND DEVICE FOR BANKNOTE IDENTIFICATION BASED ON THICKNESS SIGNAL IDENTIFICATION

This application is the national phase of International Application No. PCT/CN2014/087404, titled "METHOD AND DEVICE FOR BANKNOTE IDENTIFICATION BASED ON THICKNESS SIGNAL IDENTIFICATION", filed on Sep. 25, 2014, which claim priority to Chinese Patent Application No. 201310681853.1, titled "METHOD AND DEVICE FOR BANKNOTE IDENTIFICATION BASED ON THICKNESS SIGNAL IDENTIFICATION" and filed with the Chinese State Intellectual Property Office on Dec. 12, 2013, which applications are hereby incorporated by reference to the maximum extent allowable by law.

FIELD

The disclosure relates to the technical field of banknote identification, and in particular to a method and a device for banknote identification based on thickness signal identification.

BACKGROUND

An altered banknote is produced by combining two damaged real or counterfeit banknotes into one banknote by gluing, cutting and pitching. Malefactors produce altered banknotes to obtain illegal benefits. Circulation of these altered banknotes in the market will seriously affect the normal financial order and the financial security of the country. In addition, a spectral image of the altered banknote does not have features of a counterfeit banknote since the altered banknote is produced by splicing real banknotes and counterfeit banknotes. Therefore, the altered banknote can not be effectively identified using a digital image processing method.

After a long-time circulation, a banknote may have a lost corner, a crack or may be torn into two halves. The damaged banknote may be repaired or restored using adhesive tapes. Circulation of the repaired banknotes in the market will seriously affect national image, thus these banknotes needs to be recalled and destructed according to relevant regulations of People's Bank of China.

Since the altered banknote and the damaged banknote have same features as a normal banknote in circulation, these two types of banknotes can not be effectively identified using an image processing method. However, the thickness of these two types of banknotes has been changed substantially after being glued, cut and pitched, thus these two types of banknotes can be effectively identified using a thickness identification method.

SUMMARY

A method and a device for banknote identification based on thickness signal identification are provided according to the embodiments of the disclosure. Abnormal banknotes can be identified and separated in a simple and effective manner using the thickness identification method combining an upward area identification method and a downward area identification method.

A method for banknote identification based on thickness signal identification is provided according to the embodiment of the disclosure, which includes:
acquiring a thickness signal of a banknote;
preprocessing the thickness signal;
identifying the thickness signal using an upward area identification method to acquire an upward processing identification result;
identifying the thickness signal using a downward area identification method to acquire a downward processing identification result;
merging the upward processing identification result and the downward processing identification result according to a preset rule to acquire a merging result; and
identifying the merging result to acquire an identification result.

Optionally, after the identifying the merging result to acquire an identification result, the method may further include:
determining a classification of the banknote according to the identification result and transferring the banknote to a location corresponding to the classification of the banknote.

Optionally, the acquiring a thickness signal of a banknote may include:
acquiring the thickness signal of the banknote using multiple thickness sensors,
wherein the thickness signal is a set of signals acquired from multiple channels.

Optionally, the preprocessing the thickness signal may include:
sampling the thickness signal to acquire a sampled signal;
de-noising the sampled signal to acquire a de-noised signal; and
determining an effective signal portion of the de-noised signal.

Optionally, the identifying the thickness signal using an upward area identification method may include:
taking an area of a region formed by a sliding window, an upper threshold line and a curve of the thickness signal as a thickness feature upper area, wherein a width and a sliding step of the sliding window have preset values, and the upper threshold line is a horizontal line above the curve of the thickness signal;
moving the sliding window in a stepwise manner with the preset sliding step and calculating thickness feature upper areas at all steps;
acquiring a minimum thickness feature upper area among the thickness feature upper areas calculated at all the steps;
calculating an average thickness feature upper area of the thickness feature upper areas calculated at all the steps; and
identifying the thickness signal according to the minimum thickness feature upper area and the average thickness feature upper area to acquire the upward processing identification result.

Optionally, the identifying the thickness signal using a downward area identification method may include:
taking an area of a region formed by a sliding window, an lower threshold line and a curve of the thickness signal as a thickness feature lower area, wherein a width and a sliding step of the sliding window have preset values, and the lower threshold line is a horizontal line below the curve of the thickness signal;
moving the sliding window in a stepwise manner with the preset sliding step and calculating thickness feature lower areas at all steps;
acquiring a minimum thickness feature lower area among the thickness feature downward areas calculated at all the steps;

calculating an average thickness feature lower area of the thickness feature lower areas calculated at all the steps; and identifying the thickness signal according to the minimum thickness feature lower area and the average thickness feature lower area to acquire the downward processing identification result.

Optionally, the merging the upward processing identification result and the downward processing identification result according to a preset rule may include:

acquiring an abnormal region in each of the upward processing identification result and the downward processing identification result; and merging the abnormal region in the upward processing identification result and the abnormal region in the downward processing identification result according to the preset rule to acquire the merging result.

A device for banknote identification based on thickness signal identification is provided according to the embodiments of the disclosure, which includes a thickness sensor, a DSP chip, an embedded system and a mechanical movement module, where the thickness sensor is connected with the DSP chip and configured to acquire a thickness signal of a banknote;

the DSP chip is connected with the embedded system and configured to identify the banknote according to the thickness signal and transmit an identification result to the embedded system;

the embedded system is connected with the mechanical movement module and configured to control the mechanical movement module according to the identification result; and the mechanical movement module is configured to determine a classification of the banknote and transfer the banknote to a location corresponding to the classification of the banknote in response to a control instruction set of the embedded system.

Optionally, the thickness sensor may be a multi-channel thickness sensor.

Optionally, the DSP chip may include:

a preprocessing unit connected with both a upward processing module and a downward processing module and configured to preprocess the thickness signal;

the upward processing module connected with a merging module and configured to identify the thickness signal using an upward area identification method to acquire an upward processing identification result;

the downward processing module connected with the merging module and configured to identify the thickness signal using a downward area identification method to acquire a downward processing identification result;

the merging module connected with an identification module and configured to merge the upward processing identification result and the downward processing identification result according to a preset rule to acquire a merging result; and the identification module configured to identify the merging result to acquire an identification result.

According to the embodiments of the disclosure, firstly, a thickness signal of a banknote is acquired; then the thickness signal is preprocessed; thereafter, the thickness signal is identified using an upward area identification method to acquire an upward processing identification result; and the thickness signal is identified using a downward area identification method to acquire a downward processing identification result; and then the upward processing identification result and the downward processing identification result are merged according to a preset rule to acquire a merging result; finally, the merging result is identified to acquire an identification result. With the method and the device for banknote identification based on thickness signal identification according to the embodiments of the disclosure, the thickness signal of the banknote is acquired and then identified using the thickness identification method combining the upward area identification method and the downward area identification method, thus abnormal banknotes can be identified and separated in a simple and effective manner.

DETAILED DESCRIPTION OF THE EMBODIMENTS

According to the embodiments of the disclosure, a method and a device for banknote identification based on thickness signal identification are provided according to the embodiments of the disclosure. Abnormal banknotes can be identified and separated in a simple and effective manner using the thickness identification method combining an upward area identification method and a downward area identification method.

It should be noted that, the method and the device for banknote identification based on thickness signal identification according to the embodiments of the disclosure can be used not only for identification of banknotes, but also for identification of sheet documents such as checks, which is not limited herein. Hereinafter, the method and the device according to the embodiments of the disclosure are described by taking identification of a banknote as an example. Although only the identification of the banknote is taken as an example, the method and device according to the disclosure is not limited thereto.

Figure 1:
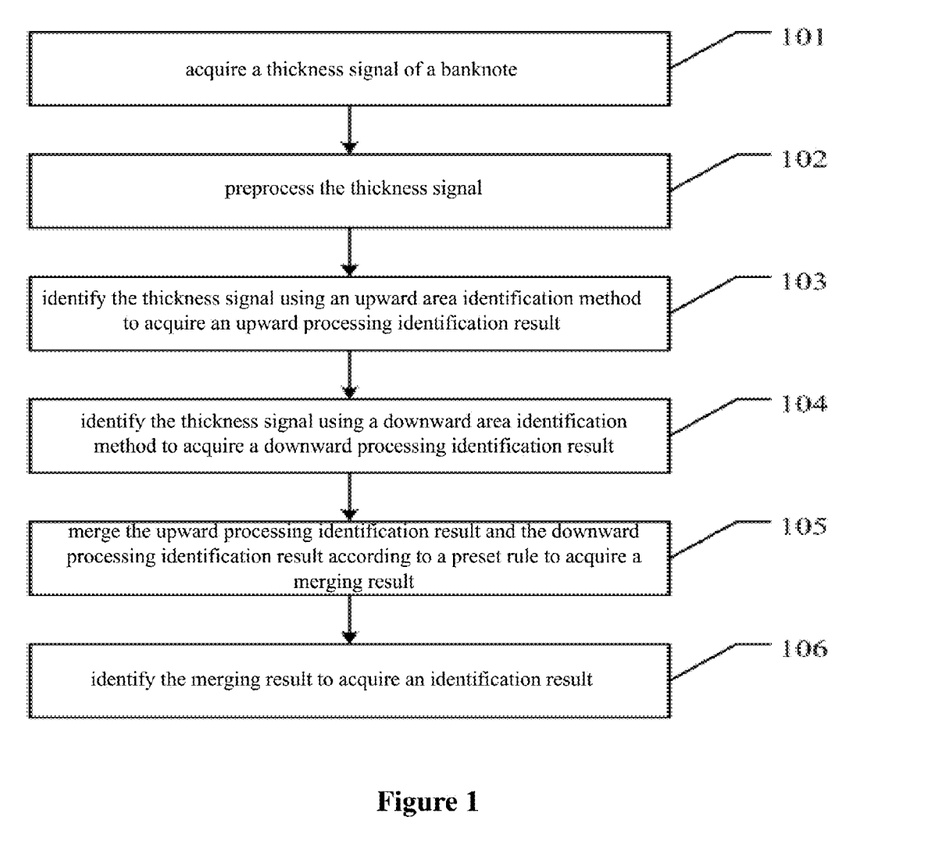
FIG. 1 is a flow chart of a method for banknote identification based on thickness signal identification according to a first embodiment of the disclosure.

Referring to FIG. 1, a method for banknote identification based on thickness signal identification according to a first embodiment of the disclosure includes the following steps 101 to 106.

In step 101, a thickness signal of a banknote is acquired.

Before the banknote is identified, the thickness signal of the banknote may be acquired using a thickness sensor.

In step 102, the thickness signal is preprocessed.

After the thickness signal is acquired, the thickness signal may be preprocessed to facilitate the identification of the thickness signal.

In step 103, the thickness signal is identified using an upward area identification method to acquire an upward processing identification result.

After the thickness signal is preprocessed, the thickness signal may be identified using the upward area identification method to acquire the upward processing identification result.

In step 104, the thickness signal is identified using a downward area identification method to acquire a downward processing identification result.

After the thickness signal is preprocessed, the thickness signal may be identified using the downward area identification method to acquire the downward processing identification result.

It should be noted that, step 103 may be performed simultaneously with step 104, or may be performed after step 104, and is not necessarily performed before step 104, which is not limited herein.

In step 105, the upward processing identification result and the downward processing identification result are merged according to a preset rule to acquire a merging result.

After the upward processing identification result and the downward processing identification result are acquired, the upward processing identification result and the downward processing identification result may be merged according to the preset rule to acquire the merging result.

In step 106, the merging result is identified to acquire an identification result.

After the merging result is acquired, the merging result may be identified to acquire the identification result.

According to the embodiments of the disclosure, firstly, a thickness signal of a banknote is acquired; then the thickness signal is preprocessed; thereafter, the thickness signal is identified using an upward area identification method to acquire an upward processing identification result; and the thickness signal is identified using a downward area identification method to acquire a downward processing identification result; and then the upward processing identification result and the downward processing identification result are merged according to a preset rule to acquire a merging result; finally, the merging result is identified to acquire an identification result. With the method for banknote identification based on thickness signal identification according to the embodiments of the disclosure, the thickness signal of the banknote is acquired and then identified using the thickness identification method combining the upward area identification method and the downward area identification method, thus abnormal banknotes can be identified and separated in a simple and effective manner.

Figure 2:
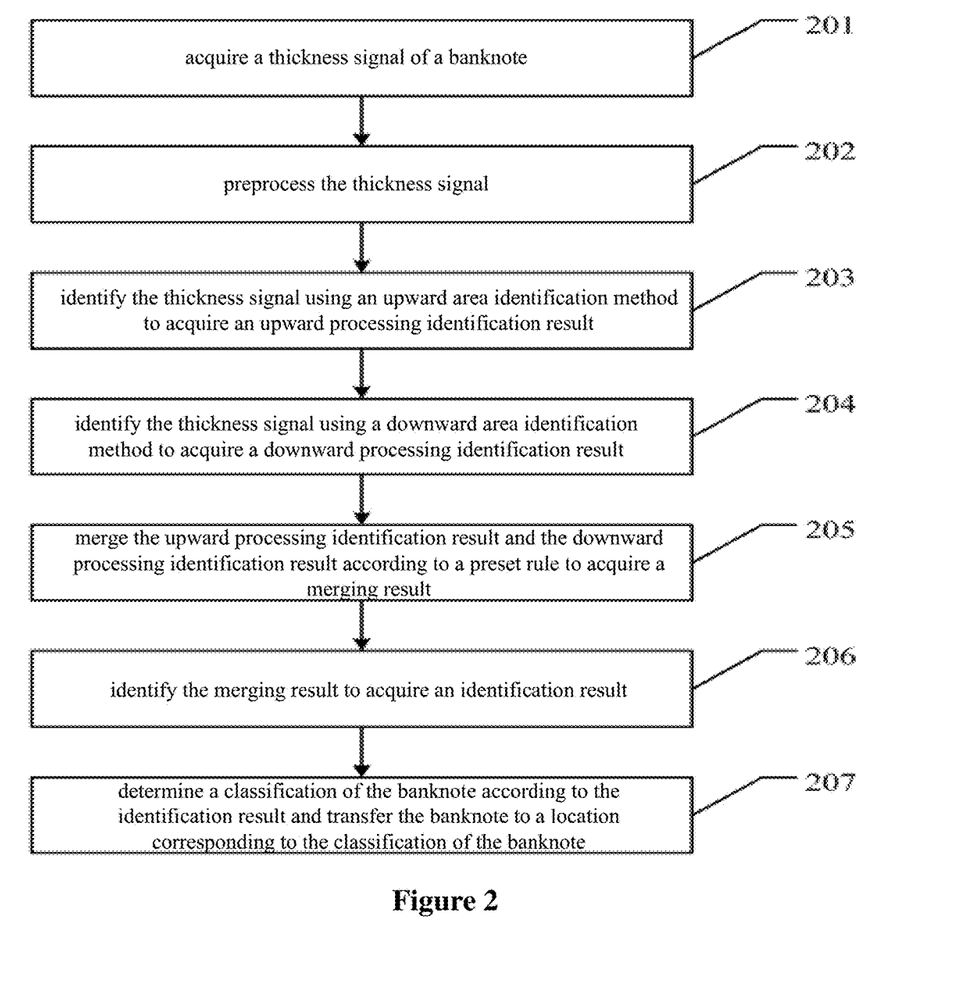
FIG. 2 is a flow chart of a method for banknote identification based on thickness signal identification according to a second embodiment of the disclosure.

In the above, the method for banknote identification based on thickness signal identification according to the first embodiment of the disclosure is described. Hereinafter, a method for banknote identification based on thickness signal identification according to a second embodiment of the disclosure will be described in detail. Referring to FIG. 2, the method for banknote identification based on thickness signal identification according to the second embodiment of the disclosure includes the following steps 201 to 207.

In step 201, a thickness signal of a banknote is acquired.

Before the banknote is identified, the thickness signal of the banknote may be acquired using a thickness sensor. The thickness sensor may be a multi-channel thickness sensor. Correspondingly, the thickness signal acquired using the multi-channel thickness sensor is a set of signals acquired from multiple channels.

Figure 3:
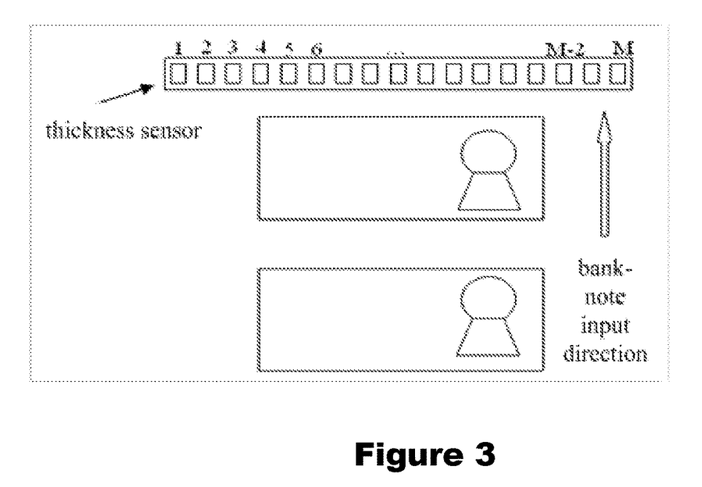
FIG. 3 is a schematic diagram of a thickness sensor acquiring a thickness signal of a banknote according to the second embodiment of the disclosure.
Figure 4:
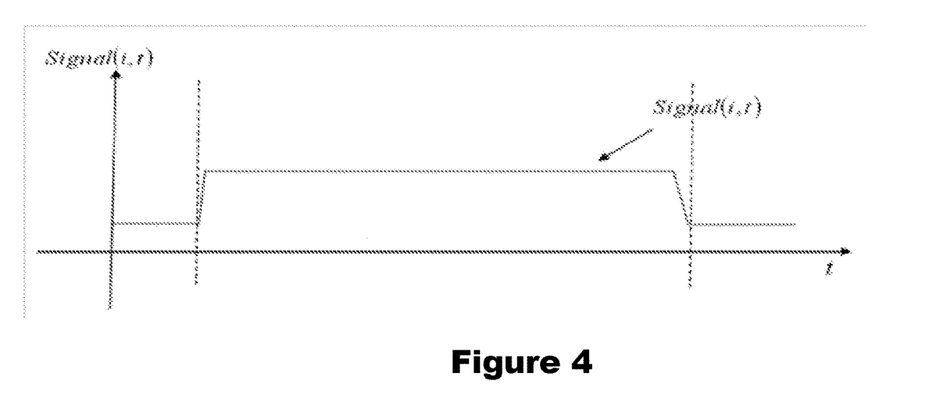
FIG. 4 is a schematic diagram of an i-th thickness signal of a normal banknote according to the second embodiment of the disclosure.

Referring to FIG. 3, each of the sensor units acquires one independent one-dimensional thickness signal which is referred to as one thickness signal. M sensors acquire a total of M thickness signals being independent from each other, which are referred to as M thickness signals. Each of the M thickness signals includes N sampling points. The thickness signal acquired by the i-th sensor is indicated by Signal(i,j) and is referred to as an i-th thickness signal. Referring to FIG. 4, a schematic diagram of an i-th thickness signal of a normal banknote is shown.

In step 202, the thickness signal is preprocessed.

After the thickness signal is acquired, the thickness signal may be preprocessed to facilitate the identification of the. The preprocessing operation may include: sampling the thickness signal to acquire a sampled signal; de-noising the sampled signal to acquire a de-noised signal; and determining an effective signal portion of the de-noised signal. The above preprocessing operation is mainly used for reducing external influences on the thickness signal.

In step 203, the thickness signal is identified using an upward area identification method to acquire an upward processing identification result.

After the thickness signal is processed, the thickness signal may be identified using the upward area identification method to acquire the upward processing identification result.

Figure 5:
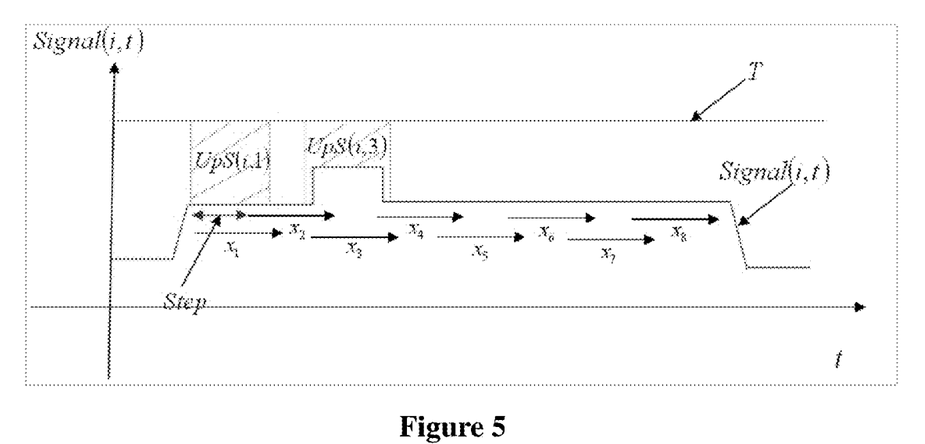
FIG. 5 is a schematic diagram of an upward area identification method for identifying a thickness signal according to the second embodiment of the disclosure.

The thickness feature upper area $UpS(i,x)$ is an area of a region formed by the sliding window X, an upper threshold line T and a curve of the thickness signal $Signal(i,t)$; a width and the sliding step step of the sliding window are preset values; the upper threshold line T is a horizontal line above the curve of the thickness signal. Particularly, referring to FIG. 5, identifying the thickness signal using the upward area identification method may include: moving the sliding window X in a stepwise manner with the preset sliding step step and calculating a thickness feature upper area $UpS(i,x)$ at each step; acquiring a minimum thickness feature upper area among the thickness feature upper areas calculated at all the steps; calculating an average thickness feature upper area of the thickness feature upper areas calculated at all the steps; and identifying the thickness signal according to the minimum thickness feature upper area and the average thickness feature upper area to acquire the upward processing identification result.

In step 204, the thickness signal is identified using a downward area identification method to acquire a downward processing identification result.

After the thickness signal is processed, the thickness signal may be identified using the downward area identification method to acquire the downward processing identification result.

Figure 6:
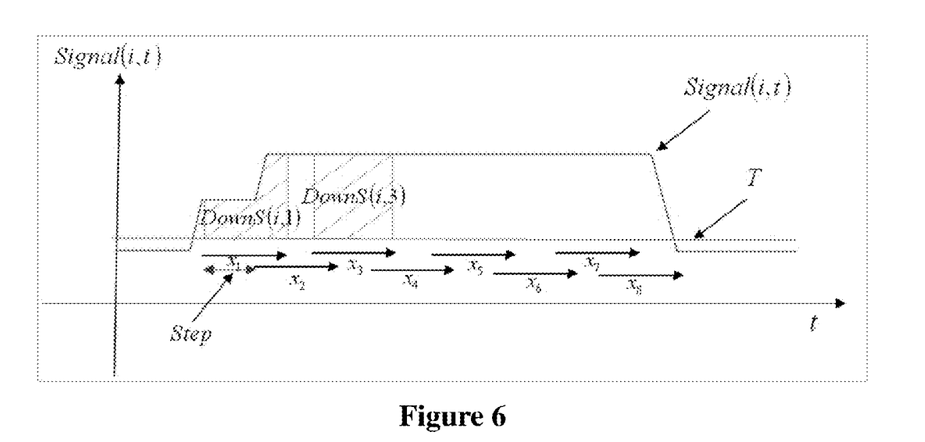
FIG. 6 is a schematic diagram of a downward area identification method for identifying a thickness signal according to the second embodiment of the disclosure.

The thickness feature lower area DownS(i,x) is an area of a region formed by the sliding window X, a lower threshold line T and a curve of the thickness signal Signal(i,t); a width and the sliding step step of the sliding window are preset values; the lower threshold line T is a horizontal line below a peak of the curve of the thickness signal. Particularly, referring to FIG. 6, identifying the thickness signal using the downward area identification method may include: moving the sliding window X in a stepwise manner with the preset sliding step step and calculating a thickness feature lower area DownS(i,x) at each step; acquiring a minimum thickness feature lower area among the thickness feature downward areas calculated at all the steps; calculating an average thickness feature lower area of the thickness feature lower areas calculated at all the steps; and identifying the thickness signal according to the minimum thickness feature lower area and the average thickness feature lower area to acquire the downward processing identification result.

It should be noted that, step 203 may be performed simultaneously with step 104, or may be performed after step 104, and is not necessarily performed before step 204, which is not limited herein.

In step 205, the upward processing identification result and the downward processing identification result are merged according to a preset rule to acquire a merging result.

After the upward processing identification result and the downward processing identification result are acquired, the upward processing identification result and the downward processing identification result may be merged according to the preset rule to acquire the merging result. Particularly, merging the upward processing identification result and the downward processing identification result according to the preset rule may include: acquiring an abnormal region in each of the upward processing identification result and the downward processing identification result; and merging the abnormal region in the upward processing identification result and the abnormal region in the downward processing identification result according to the preset rule to acquire the merging result.

In step 206, the merging result is identified to acquire an identification result.

After the merging result is acquired, the merging result may be identified to acquire the identification result. The banknote may be identified as an altered banknote in a case that the abnormal region of the merging result covers a discrimination region of the banknote; the banknote may be identified as a damaged banknote in a case that an area of the abnormal region of the merging result exceeds a fixed threshold; or else, the banknote may be identified as a banknote that may be put into circulation.

It should be noted that, the fixed threshold is predetermined according to banknotes to be detected and a device configuration, and is not limited herein.

In step 207, a classification of the banknote is determined according to the identification result and the banknote is transferred to a location corresponding to the classification of the banknote.

After the identification result is acquired, the classification of the banknote is determined according to the identification result and the banknote is transferred to the location corresponding to the classification of the banknote. For example, various types of banknotes may be transferred to predetermined dispensing locations thereby implementing banknote identification.

Hereinafter, an operation procedure of the embodiment of the disclosure is described in detail in conjunction with a particular example.

In a first step, a thickness signal of a banknote is acquired.

Figure 7:
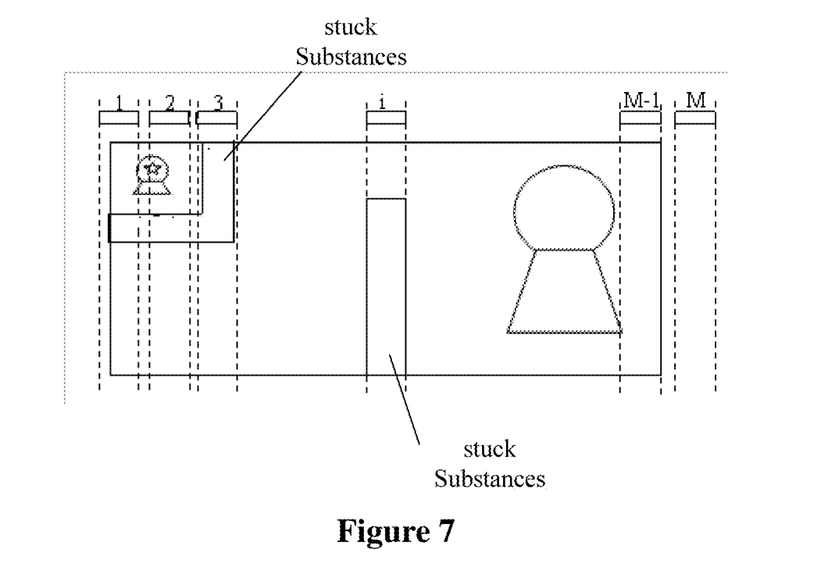
FIG. 7 is a schematic diagram of transmission of an altered banknote according to the second embodiment of the disclosure.
Figure 8:
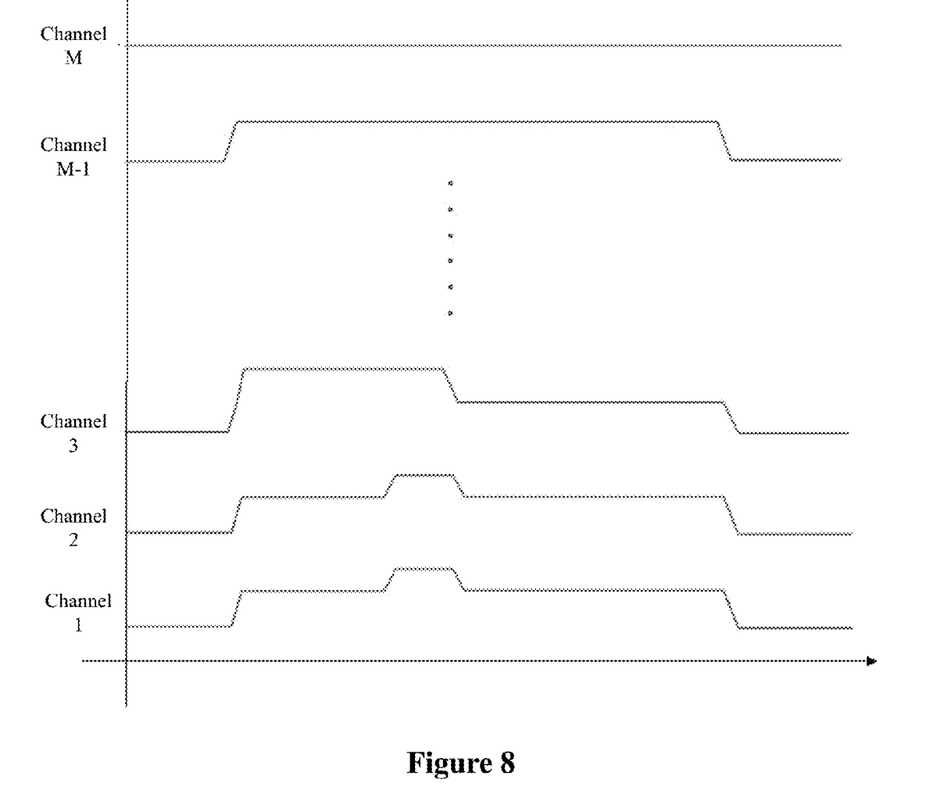
FIG. 8 is a schematic diagram of thickness signals of the altered banknote according to the second embodiment of the disclosure.

Referring to FIG. 7, a schematic diagram of transmission of an altered banknote is shown. During the banknote transmission, regions attached with stickers are covered by four thickness sensors. A schematic diagram of the acquired thickness signals is shown in FIG. 8. A thickness sensor with M sensor units is adopted, where each of the thickness signals includes N sampling points.

In a second step, the thickness signal is preprocessed.

The following constrains are adopted: a start channel and end channel determination threshold $Th_{notethk}=\eta THK$, where $\eta\epsilon[0.4,0.6]$; a start point and end point determination threshold $Th_{notethk}=\eta THK$, where $\eta\epsilon[0.4,0.6]$. The above constrains are used for determining thickness signals of a banknote region and removing thickness signals of a background region.

Firstly, a start point of each channel is determined. For a signal MThkSignal(i,j), a point satisfied the following set of inequalities is determined to be the start point of the i-th channel, which is indicated by $P_{start}(i)=j$:

$$\begin{cases} MThkSignal(i, j) > Th_{notethk} \\ MThkSignal(i, j+1) > Th_{notethk} \\ MThkSignal(i, j+2) > Th_{notethk} \\ MThkSignal(i, j-1) < Th_{notethk} \\ MThkSignal(i, j-2) < Th_{notethk} \end{cases}$$

where $i\epsilon(0, N]$, and $j\epsilon(2,length-2]$.

Then, an end point of each channel is determined. For the signal MThkSignal(i,j), a point satisfied the following set of inequalities is determined to be the end point of the i-th channel, which is indicated by $P_{end}(i)=j$:

$$\begin{cases} MThkSignal(i, j) > Th_{notethk} \\ MThkSignal(i, j-1) > Th_{notethk} \\ MThkSignal(i, j-2) > Th_{notethk} \\ MThkSignal(i, j+1) < Th_{notethk} \\ MThkSignal(i, j+2) < Th_{notethk} \end{cases}$$

where $i\epsilon(0, N]$, and $j\epsilon(2,length-2]$.

Then a start channel signal is determined. In a case that an average thickness ThkAvg(i) of an i-th channel satisfies the following set of inequalities, the i-th channel is determined to be the start channel, which is indicated by $C_{start}=i$;

$$\begin{cases} ThkAvg(i) < Th_{notethk} \\ ThkAvg(i+1) > Th_{notethk} \\ ThkAvg(i+2) > Th_{notethk} \end{cases},$$

where $i\epsilon(0, N]$.

Then an end channel is determined. In a case that an average thickness ThkAvg(i) of an i-th channel satisfies the following set of inequalities, the i-th channel is determined to be the end channel, which is indicated by $C_{end}=i$:

$$\begin{cases} ThkAvg(i) < Th_{notethk} \\ ThkAvg(i-1) > Th_{notethk} \\ ThkAvg(i-2) > Th_{notethk} \end{cases}$$

Figure 9:
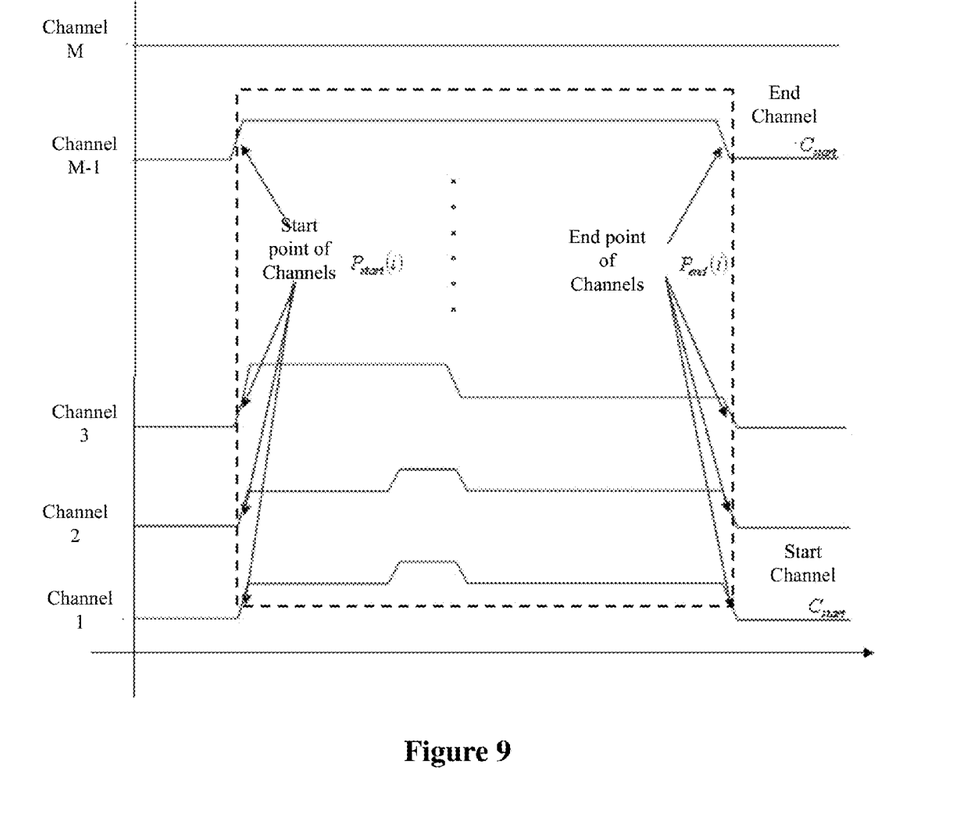
FIG. 9 is a schematic diagram of an effective signal portion of the thickness signal of the altered banknote according to the second embodiment of the disclosure.

Referring to FIG. 9, for the examples shown in FIG. 7, the start point and the end point of each channel, the start channel and the end channel of the thickness signal of the altered banknote are determined with the above method thus an effective portion of the thickness signal is acquired. The effective portion is schematically shown in FIG. 9 by the portion enclosed by a black doted box.

In a third step, the thickness signal is identified using an upward area identification method to acquire an upward processing identification result.

The following constrains are adopted. $\Delta$ indicates the number of sampling points of the thickness signal in a length of 1 cm (which is determined by banknote transmission rate and DSP sampling frequency). A width $x\Delta$ of a sliding window indicates the number of sampling points of the thickness signal in a width of x cm. In the following, the width $x\Delta$ of the sliding window varies with x. An upper threshold $UpTh=THK_{note}+\eta thk$, where $\eta \in [1.5,2]$; a sliding step $step=\delta x\Delta$, where $\delta \in (0,0.5)$; an abnormal region determination threshold corresponding to the sliding window $x\Delta$ is indicated by $ThUpS_{x\Delta}=\eta_1 thkx\Delta$, where $\eta_1 < \eta - 0.7$.

Firstly, an upper area of each sliding window is calculated. A thickness signal upper area corresponding to a n-th sliding window may be indicated by $UpS(i,n)$, and calculated with the following equation:

$$UpS(i, n) = \sum_{j=P_{start}(i)+n \times step}^{P_{start}(i)+n \times step+x\Delta} (UpTh - MThkSignal(i, j)),$$

where $i \in [C_{start}, C_{end}]$, $n \in [0, N(i)]$, $$N(i) = int\left(\frac{P_{end}(i) - P_{start}(i) - x\Delta}{step}\right) + 1, \text{ and } 0 < \delta < 1.$$

In the above equation, $P_{Start}(i)$ is a start point of the banknote thickness acquisition region of an i-th thickness signal, $P_{end}(i)$ is an end point of the banknote thickness acquisition region of the i-th thickness signal, n is a n-th sliding window, MThkSignal(i,j) is an amplitude of a j-th sampling point of the median-filtered i-th signal, $C_{start}$ is a start channel signal, $C_{end}$ is an end channel signal, and N(i) is the number of sliding windows of the i-th thickness signal.

Then a minimum thickness feature upper area is calculated for each sliding window. The minimum thickness feature upper area may be calculated with the equation $$UpS_{min}(i) = \min_{n \in [0,N(i)]} (UpS(i, n)),$$

where min( ) is a minimum value function.

Then an average thickness feature upper area is calculated for each sliding window. The average thickness feature upper area may be calculated with the equation $$UpS_{avg}(i) = \frac{\sum_{n=0}^{N(i)-1} UpS(n, i)}{N(i)}.$$

Finally, a determination is made according to the minimum thickness feature upper area and the average thickness feature upper area, and a region with abnormal thickness is recorded.

It is determined whether the inequality $UpS_{avg}(i) - UpS_{min}(i) \geq ThUpS_{x\Delta}$ is satisfied; in a case that the inequality is satisfied, it is determined that this signal indicates an abnormal thickness, and an area $S_x(i)$ of the region with abnormal thickness and a position $Area_R(i)$ of the region with abnormal thickness are recorded; otherwise, it is determined that the thickness signal does not indicate an abnormal thickness.

Figure 10:
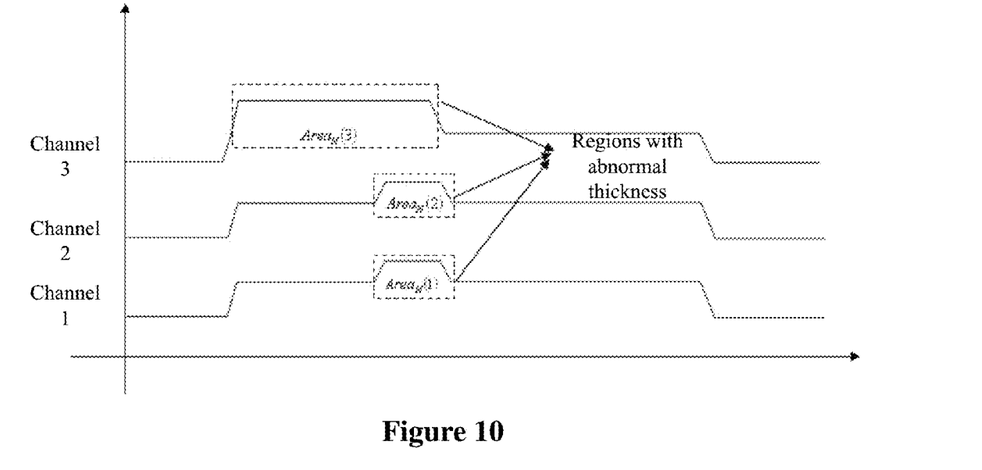
FIG. 10 is a flow chart of a method for identifying banknotes with abnormal thickness according to the second embodiment of the disclosure.

Referring to FIG. 10, for the case shown in FIG. 7, each signal is identified with the upward area identification method, where sliding windows with widths of $\Delta$ and $3\Delta$ are used. It is determined that a first thickness signal, a second thickness signal and a third thickness signal indicate an abnormal thickness, the regions $Area_R(1)$, $Area_R(2)$, and $Area_R(3)$ with abnormal thickness are recorded, and areas of three regions corresponding to regions on the banknote attached with other substances are indicated by $S^s(1)$, $S_s(2)$, and $S_s(3)$ respectively.

In a fourth step, the thickness signal is identified using a downward area identification method to acquire a downward processing identification result.

The following constrains are adopted. An lower threshold $DownTh=\eta THK_{note}$, where $\eta \in [0.4,0.6]$; a sliding step $step=\delta x\Delta$, where $\delta \in (0,0.5)$; an abnormal region lower area determination threshold corresponding to the sliding window $x\Delta$ is indicated by $ThDownS_{x\Delta}=\eta THK_{note}+\eta_1 thkx\Delta$, where $\eta \in [0.4,0.6]$, and $\eta_1 \in [0.8,2]$; and a minimum lower area threshold is indicated by $ThDownS_{min\ x\Delta}=\rho\eta THK_{note}x\Delta$, where $\rho \in [0.8,1)$.

Firstly, a lower area of each sliding window is calculated. A thickness signal lower area corresponding to a n-th sliding window may be indicated by Down(i,n), and calculated with the following equation:

$$UpS(i, n) = \sum_{j=P_{start}(i)+n \times step}^{P_{start}(i)+n \times step+x\Delta} (UpTh - MThkSignal(i, j)).$$

Definitions of parameters in the above equation are the same with that of the parameters in the upward area identification method.

Then a minimum thickness feature lower area is calculated for each sliding window. The minimum thickness feature lower area $DownS_{min}(i)$ may be calculated with the following equation:

$$DownS_{min}(i) = \min_{n \in [0,N(i)]} (UpS(i, n)).$$

Then an average thickness feature lower area is calculated for each sliding window. The average thickness feature lower area $DownS_{avg}(i)$ may be calculated with the following equation:

$$DownS_{avg}(i) = \frac{\sum_{n=0}^{N(i)-1} DownS(n, i)}{N(i)}.$$

Finally, a determination is made according to the minimum thickness feature lower area and the average thickness feature lower area, and a thickness abnormal region is recorded.

It is determined whether the following set of inequalities is satisfied:

$$\begin{cases} DownS_{avg}(i) - DownS_{min}(i) \geq ThDownS_{x\Delta} \\ DownS_{min}(i) \geq ThDownS_{minx\Delta} \end{cases}$$

In a case that the inequality set is satisfied, it is determined that this thickness signal indicates an abnormal thickness, an area $S_s(i)$ of the region with abnormal thickness and a position $Area_R(i)$ of the region with abnormal thickness are recorded; otherwise, it is determined that the thickness signal does not indicate abnormal thickness.

Figure 11:
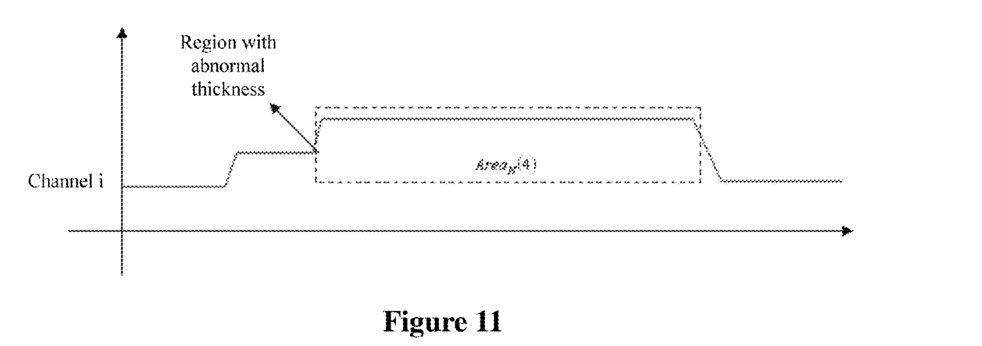
FIG. 11 a schematic diagram of transmission of an altered banknote according to the second embodiment of the disclosure.

Referring to FIG. 11, for the case shown in FIG. 7, each thickness signal is identified with the downward area identification method, where a sliding window with a width of $\Delta$ is used. It is determined that an i-th thickness signal indicates an abnormal thickness, the region $Area_R(4)$ with abnormal thickness is recorded, and an area of the region corresponding to a region on the banknote attached with other substances is indicated by $S_s(4)$.

In a fifth step, the upward processing identification result and the downward processing identification result are merged according to a preset rule to acquire a merging result.

The following constrains are adopted: a position of a discrimination region indicated by $Area_N$ (this parameter is determined according to various currencies and denominations, for example, discrimination region of a 100 yuan RMB includes a region with watermark and a region with the national emblem); an area threshold $T_S$ of the region with abnormal thickness (this value may be set according to different detection criterions, for example, this value may be set to 4 cm² according to ECB monetary circulation standards).

Firstly, it is determined whether the region with abnormal thickness covers the discrimination region.

The banknote is determined to be an altered banknote in a case that the region with abnormal thickness covers the discrimination region $Area_N$.

Then, it is determined whether the area of the region with abnormal thickness is relatively large.

The banknote is determined to be a damaged banknote in a case that the region with abnormal thickness does not cover the discrimination region and the area of the region with abnormal thickness is larger than a threshold $Th_s$; otherwise, the bank note is determined to be a banknote that may be put into circulation.

For the case shown in FIG. 7, since regions with abnormal thickness $Area_R(1)$, $Area_R(2)$ and $Area_R(3)$ and cover the discrimination region, and the area $S_S(1)+S_S(2)+S_S(3)+S_S(4)$ of the regions with abnormal thickness is larger than the threshold $Th_s$, the banknote is determined to be an altered banknote.

According to the embodiments of the disclosure, firstly, a thickness signal of a banknote is acquired; then the thickness signal is preprocessed; thereafter, the thickness signal is identified using an upward area identification method to acquire an upward processing identification result; and the thickness signal is identified using a downward area identification method to acquire a downward processing identification result; and then the upward processing identification result and the downward processing identification result are merged according to a preset rule to acquire a merging result; finally, the merging result is identified to acquire an identification result. With the method for banknote identification based on thickness signal identification according to the embodiments of the disclosure, the thickness signal of the banknote is acquired and then identified using the thickness identification method combining the upward area identification method and the downward area identification method, thus abnormal banknotes can be identified and separated in a simple and effective manner.

Figure 12:
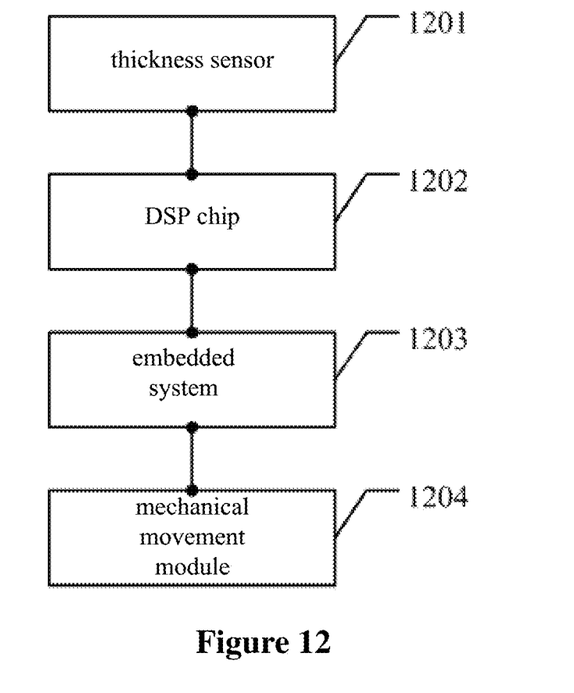
FIG. 12 is a schematic structural diagram of a device for banknote identification based on thickness signal identification according to the embodiments of the disclosure.

In the above, the method for banknote identification based on thickness signal identification according to the second embodiment of the disclosure is described in detail. The procedure of identifying the thickness signal with the upward area identification method and the downward area identification method is particularly described. Hereinafter, a device for banknote identification based on thickness signal identification according to the embodiments of the disclosure is described. Referring to FIG. 12, the device for banknote identification based on thickness signal identification according to an embodiment of the disclosure includes:

a thickness sensor 1201, a DSP chip 1202, an embedded system 1203 and a mechanical movement module 1204, where the thickness sensor 1201 is connected with the DSP chip 1202 and configured to acquire a thickness signal of a banknote;

the DSP chip 1202 is connected with the embedded system 1203 and configured to identify the banknote according to the thickness signal and transmit an identification result to the embedded system 1203;

the embedded system 1203 is connected with the mechanical movement module 1204 and configured to control the mechanical movement module 1204 according to the identification result; and the mechanical movement module 1204 is configured to determine a classification of the banknote and transfer the banknote to a location corresponding to the classification of the banknote in response to a control instruction set of the embedded system 1204.

Optionally, the thickness sensor 1201 may be a multi-channel thickness sensor.

Optionally, the DSP chip 1202 may include:

a preprocessing unit connected with both a upward processing module and a downward processing module and configured to preprocess the thickness signal;

the upward processing module connected with a merging module and configured to identify the thickness signal using an upward area identification method to acquire an upward processing identification result;

the downward processing module connected with the merging module and configured to identify the thickness signal using a downward area identification method to acquire a downward processing identification result;

the merging module connected with an identification module and configured to merge the upward processing identification result and the downward processing identification result according to a preset rule to acquire a merging result; and the identification module configured to identify the merging result to acquire an identification result.

In the embodiment of the disclosure, firstly, the thickness sensor 1201 acquires the thickness signal of the banknote, and transmits the thickness signal to the DSP chip 1202 thus the thickness signal may be analyzed and identified; after acquiring the identification result, the DSP chip 1202 transmits the identification result to the embedded system 1203; the embedded system 1203 controls the mechanical movement module 1204 to transmit the banknote to be put into circulation, the damaged banknote and the altered banknote to different dispensing positions thereby achieving classification of different types of banknotes.

In the embodiment of the disclosure, a device for banknote identification based on thickness signal identification includes a thickness sensor 1201, a DSP chip 1202, an embedded system 1203 and a mechanical movement module 1204, where the thickness sensor 1201 is connected with the DSP chip 1202 and configured to acquire a thickness signal of a banknote; the DSP chip 1202 is connected with the embedded system 1203 and configured to identify the banknote according to the thickness signal and transmit an identification result to the embedded system 1203; the embedded system 1203 is connected with the mechanical movement module 1204 and configured to control the mechanical movement module 1204 according to the identification result; and the mechanical movement module 1204 is configured to determine a classification of the banknote and transfer the banknote to a location corresponding to the classification of the banknote in response to a control instruction set of the embedded system 1203. With the device for banknote identification based on thickness signal identification according to the embodiments of the disclosure, the thickness sensor 1201 acquires the thickness signal of a banknote, and then the DSP chip 1202 identifies the thickness signal using the thickness identification method combining an upward area identification method and a downward area identification method, thus abnormal banknotes can be identified and separated in a simple and effective manner.

It can be understood by those skilled in the art that all or some of steps in the methods according to the above embodiments may be implemented by hardware instructed by a program. The program may be stored in a computer-readable storage medium, which may be a read-only memory, a magnetic disk or an optical disk.

In the above, the method and the device for banknote identification based on thickness signal identification have been described in detail. Variations can be made to the embodiments and the application scope by those skilled in the art based on the idea of the invention. In total, the content of the specification can be not interpreted as to limit the invention.

The invention claimed is:

1. A method for banknote identification based on thickness signal identification, comprising:
　acquiring a thickness signal of a banknote;
　preprocessing the thickness signal;
　identifying the thickness signal using an upward area identification method to acquire an upward processing identification result;
　identifying the thickness signal using a downward area identification method to acquire a downward processing identification result;
　merging the upward processing identification result and the downward processing identification result according to a preset rule to acquire a merging result; and
　identifying the merging result to acquire an identification result;
　wherein the identifying the thickness signal using an upward area identification method comprises:
　　taking an area of a region formed by a sliding window, an upper threshold line and a curve of the thickness signal as a thickness feature upper area, wherein a width and a sliding step of the sliding window have preset values, and the upper threshold line is a horizontal line above the curve of the thickness signal;
　　moving the sliding window in a stepwise manner with the preset sliding step and calculating thickness feature upper areas at all steps;
　　acquiring a minimum thickness feature upper area among the thickness feature upper areas calculated at all the steps;
　　calculating an average thickness feature upper area of the thickness feature upper areas calculated at all the steps; and
　　identifying the thickness signal according to the minimum thickness feature upper area and the average thickness feature upper area to acquire the upward processing identification result;
　wherein the identifying the thickness signal using a downward area identification method comprises:
　　taking an area of a region formed by a sliding window, an lower threshold line and a curve of the thickness signal as a thickness feature lower area, wherein a width and a sliding step of the sliding window have preset values, and the lower threshold line is a horizontal line below the curve of the thickness signal;
　　moving the sliding window in a stepwise manner with the preset sliding step and calculating thickness feature lower areas at all steps;
　　acquiring a minimum thickness feature lower area among the thickness feature downward areas calculated at all the steps;
　　calculating an average thickness feature lower area of the thickness feature lower areas calculated at all the steps; and
　　identifying the thickness signal according to the minimum thickness feature lower area and the average thickness feature lower area to acquire the downward processing identification result.

2. The method for banknote identification based on thickness signal identification according to claim 1, wherein, after the identifying the merging result to acquire the identification result, the method further comprises:
　determining a classification of the banknote according to the identification result and transferring the banknote to a location corresponding to the classification of the banknote.

3. The method for banknote identification based on thickness signal identification according to claim 1, wherein the acquiring the thickness signal of the banknote comprises:
　acquiring the thickness signal of the banknote using a multi-channel thickness sensor,
　wherein the thickness signal is a set of signals acquired from multiple channels.

4. The method for banknote identification based on thickness signal identification according to claim 1, wherein the preprocessing the thickness signal comprises:
　sampling the thickness signal to acquire a sampled signal;
　de-noising the sampled signal to acquire a de-noised signal; and
　determining an effective signal portion of the de-noised signal.

5. The method for banknote identification based on thickness signal identification according to claim 1, wherein the merging the upward processing identification result and the downward processing identification result according to a preset rule comprises:

acquiring an abnormal region in each of the upward processing identification result and the downward processing identification result; and merging the abnormal region in the upward processing identification result and the abnormal region in the downward processing identification result according to the preset rule to acquire the merging result.

6. A device for banknote identification based on thickness signal identification, comprising a thickness sensor, a DSP chip, an embedded system and a mechanical movement module, wherein:

the thickness sensor is connected with the DSP chip and configured to acquire a thickness signal of a banknote;

the DSP chip is connected with the embedded system and configured to identify the banknote according to the thickness signal based on an upward area identification method and a downward area identification method and transmit an identification result to the embedded system;

the embedded system is connected with the mechanical movement module and configured to control the mechanical movement module according to the identification result; and the mechanical movement module is configured to determine a classification of the banknote and transfer the banknote to a location corresponding to the classification of the banknote in response to a control instruction set of the embedded system;

wherein the upward area identification method comprises:

taking an area of a region formed by a sliding window, an upper threshold line and a curve of the thickness signal as a thickness feature upper area, wherein a width and a sliding step of the sliding window have preset values, and the upper threshold line is a horizontal line above the curve of the thickness signal;

moving the sliding window in a stepwise manner with the preset sliding step and calculating thickness feature upper areas at all steps;

acquiring a minimum thickness feature upper area among the thickness feature upper areas calculated at all the steps;

calculating an average thickness feature upper area of the thickness feature upper areas calculated at all the steps; and identifying the thickness signal according to the minimum thickness feature upper area and the average thickness feature upper area to acquire the upward processing identification result; and wherein the downward area identification method comprises:

taking an area of a region formed by a sliding window, an lower threshold line and a curve of the thickness signal as a thickness feature lower area, wherein a width and a sliding step of the sliding window have preset values, and the lower threshold line is a horizontal line below the curve of the thickness signal;

moving the sliding window in a stepwise manner with the preset sliding step and calculating thickness feature lower areas at all steps;

acquiring a minimum thickness feature lower area among the thickness feature downward areas calculated at all the steps;

calculating an average thickness feature lower area of the thickness feature lower areas calculated at all the steps; and identifying the thickness signal according to the minimum thickness feature lower area and the average thickness feature lower area to acquire the downward processing identification result.

7. The device for banknote identification based on thickness signal identification according to claim 6, wherein the thickness sensor is a multi-channel thickness sensor.

8. The device for banknote identification based on thickness signal identification according to claim 6, wherein the DSP chip comprises:

a preprocessing unit connected with both a upward processing module and a downward processing module and configured to preprocess the thickness signal;

the upward processing module connected with a merging module and configured to identify the thickness signal using an upward area identification method to acquire an upward processing identification result;

the downward processing module connected with the merging module and configured to identify the thickness signal using a downward area identification method to acquire a downward processing identification result;

the merging module connected with an identification module and configured to merge the upward processing identification result and the downward processing identification result according to a preset rule to acquire a merging result; and the identification module configured to identify the merging result to acquire an identification result.

9. The method for banknote identification based on thickness signal identification according to claim 2, wherein the preprocessing the thickness signal comprises:

sampling the thickness signal to acquire a sampled signal;

de-noising the sampled signal to acquire a de-noised signal; and determining an effective signal portion of the de-noised signal.

10. The method for banknote identification based on thickness signal identification according to claim 3, wherein the preprocessing the thickness signal comprises:

sampling the thickness signal to acquire a sampled signal;

de-noising the sampled signal to acquire a de-noised signal; and determining an effective signal portion of the de-noised signal.

11. The method for banknote identification based on thickness signal identification according to claim 2, wherein the merging the upward processing identification result and the downward processing identification result according to a preset rule comprises:

acquiring an abnormal region in each of the upward processing identification result and the downward processing identification result; and merging the abnormal region in the upward processing identification result and the abnormal region in the downward processing identification result according to the preset rule to acquire the merging result.

12. The method for banknote identification based on thickness signal identification according to claim 3, wherein the merging the upward processing identification result and the downward processing identification result according to a preset rule comprises:

acquiring an abnormal region in each of the upward processing identification result and the downward processing identification result; and merging the abnormal region in the upward processing identification result and the abnormal region in the downward processing identification result according to the preset rule to acquire the merging result.

13. The device for banknote identification based on thickness signal identification according to claim 7, wherein the DSP chip comprises:
- a preprocessing unit connected with both a upward processing module and a downward processing module and configured to preprocess the thickness signal;
- the upward processing module connected with a merging module and configured to identify the thickness signal using an upward area identification method to acquire an upward processing identification result;
- the downward processing module connected with the merging module and configured to identify the thickness signal using a downward area identification method to acquire a downward processing identification result;
- the merging module connected with an identification module and configured to merge the upward processing identification result and the downward processing identification result according to a preset rule to acquire a merging result; and
- the identification module configured to identify the merging result to acquire an identification result.

* * * * *